US012644514B1

(12) United States Patent
Kang et al.

(10) Patent No.: US 12,644,514 B1
(45) Date of Patent: Jun. 2, 2026

(54) APPARATUS AND METHOD FOR SUPPORTING OFF-ROAD DRIVING AND VEHICLE AND STORAGE MEDIUM INCLUDING THE SAME

(71) Applicants: Hyundai Motor Company, Seoul (KR); Kia Corporation, Seoul (KR)

(72) Inventors: Jun Han Kang, Hwaseong-Si (KR); Young Il Kim, Hwaseong-Si (KR); Da Hoon Jeong, Hwaseong-Si (KR); Ji Hun Byun, Hwaseong-Si (KR); Ik Jin Um, Hwaseong-Si (KR); In Ho Oh, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 19/299,146

(22) Filed: Aug. 13, 2025

(30) Foreign Application Priority Data

Mar. 24, 2025 (KR) ........................ 10-2025-0037163

(51) Int. Cl.
| | |
|---|---|
| *F16H 61/16* | (2006.01) |
| *F16H 59/44* | (2006.01) |
| *F16H 59/66* | (2006.01) |
| *F16H 61/02* | (2006.01) |

(52) U.S. Cl.
CPC ............. *F16H 61/16* (2013.01); *F16H 59/44* (2013.01); *F16H 59/66* (2013.01); *F16H*

*61/0213* (2013.01); *F16H 2061/0227* (2013.01); *F16H 2061/163* (2013.01)

(58) Field of Classification Search
CPC .......... F16H 59/44; F16H 59/66; F16H 59/50; F16H 61/16; F16H 61/0213; F16H 2061/0227; F16H 2061/163
See application file for complete search history.

(56) References Cited

U.S. PATENT DOCUMENTS

| | | | | |
|---|---|---|---|---|
| 11,226,035 B1* | 1/2022 | Hill | .......................... | F16H 59/66 |
| 2012/0309585 A1* | 12/2012 | Whitney | .............. | B60W 10/10 |
| | | | | 477/3 |
| 2014/0107900 A1* | 4/2014 | Shultz | ..................... | F16H 61/68 |
| | | | | 701/56 |

FOREIGN PATENT DOCUMENTS

KR      102540553 B1 *   6/2023   ............ B60W 10/08

* cited by examiner

*Primary Examiner* — Edwin A Young
(74) *Attorney, Agent, or Firm* — MORGAN, LEWIS & BOCKIUS LLP

(57) ABSTRACT

An apparatus for supporting off-road driving includes a controller configured to receive off-road driving data of a vehicle and control a shift timing of the vehicle according to shift timing control data by applying the off-road driving data to a shift timing control logic, wherein the shift timing control logic may be configured to vary the shift timing according to a possibility of the vehicle stuck in off-road terrain based on the off-road driving data.

20 Claims, 10 Drawing Sheets

$$SH = \frac{H1+H2+H3+H4}{4}$$

STORE SHIFT TIMING CONTROL LOGIC OF VEHICLE (V) BASED ON POSSIBILITY OF VEHICLE STUCK ON OFF-ROAD (OR) — S110

RECEIVE OFF-ROAD DRIVING DATA OF VEHICLE — S120

CONTROL SHIFT TIMING OF VEHICLE BY APPLYING OFF-ROAD DRIVING DATA TO SHIFT TIMING CONTROL LOGIC — S130

Stuck Score →

| SAND | 10 | 20 | 30 | 40 | 50 | 70 | 90 |
|------|----|----|----|----|----|----|----|
| 0 | 0 | 0 | 0 | 0 | 0 | 0 | 0 |
| 10 | −30 | 0 | 0 | 0 | 0 | 30 | 30 |
| 20 | −50 | −30 | 0 | 0 | 30 | 50 | 50 |
| 30 | −50 | −50 | 0 | 0 | 50 | 70 | 70 |
| 40 | −100 | −70 | 0 | 0 | 70 | 100 | 100 |
| 50 | −100 | −70 | 0 | 0 | 70 | 100 | 100 |

VEHICLE SPEED ↓

Stuck Score →

| SNOW | 10 | 20 | 30 | 40 | 50 | 70 | 90 |
|------|----|----|----|----|----|----|----|
| 0 | 0 | 0 | 0 | 0 | 0 | 0 | 0 |
| 10 | 0 | 0 | 0 | 30 | 30 | 30 | 30 |
| 20 | 0 | 10 | 30 | 50 | 50 | 50 | 50 |
| 30 | 0 | 20 | 50 | 70 | 70 | 70 | 70 |
| 40 | 0 | 50 | 70 | 100 | 100 | 100 | 100 |
| 50 | 0 | 50 | 70 | 100 | 100 | 100 | 100 |

VEHICLE SPEED ↓

FIG. 9

APPARATUS AND METHOD FOR SUPPORTING OFF-ROAD DRIVING AND VEHICLE AND STORAGE MEDIUM INCLUDING THE SAME

CROSS-REFERENCE TO RELATED APPLICATION(S)

The present application claims benefit of priority to Korean Patent Application No. 10-2025-0037163 filed on Mar. 24, 2025, in the Korean Intellectual Property Office, the disclosure of which is incorporated herein by reference in its entirety.

BACKGROUND

1. Field

The present disclosure relates to an apparatus and method for supporting off-road driving and a vehicle and storage medium including the same.

2. Description of Related Art

The number of people who enjoy camping using vehicles and the number of people who enjoy off-road driving sports have continuously increased. Accordingly, a technology allowing comfortable and safe driving on unpaved off-road terrain other than general paved roads has been required, and thus, various vehicle driving control modes helping to control the driving of vehicles specialized for off-road applications have been developed.

When driving off-road, it is important to drive so that vehicles do not get stuck. Here, a stuck vehicle refers to a vehicle in a state in which the vehicle is stuck in the road surface and cannot move. If a vehicle gets stuck, not only will the vehicle not be able to move, but it may also be very difficult to move the vehicle that has been stuck once again. In particular, in the case of inexperienced drivers, as they try to control the vehicle more strongly to escape from the stuck state, the vehicle may become more stuck, and the stuck vehicle may eventually be freed from the stuck state only by using external force, such as that of a tow truck.

Therefore, when a vehicle is driven off-road, such as on an unpaved road, it is important that the vehicle does not get stuck, that is, unable to move in the road surface.

SUMMARY

An aspect of the present disclosure is to provide an apparatus and method for supporting off-road driving and a vehicle and storage medium including the same, configured for efficiently increasing the overall optimality of at least one of driving force, noise-vibration-harshness (NVH), and/or driving feel of the vehicle, while effectively reducing the overall final possibility of vehicle stuck in off-road terrain even if road surface severity of the off-road terrain varies.

According to an aspect of the present disclosure, an apparatus for supporting off-road driving may include: a controller configured to receive off-road driving data of a vehicle and control a shift timing of the vehicle according to shift timing control data by applying the off-road driving data to a shift timing control logic, wherein the shift timing control logic may be configured to vary the shift timing according to a possibility of the vehicle stuck in off-road terrain based on the off-road driving data.

The shift timing control logic may be configured so that the controller delays an upshift timing more when the possibility of vehicle stuck is higher than a shift delay criterion compared to when the possibility of vehicle stuck is lower than the shift delay criterion.

The shift delay criterion may include a first shift delay criterion and a second shift delay criterion higher than the first shift delay criterion, and the shift timing control logic may be configured so that when the possibility of vehicle stuck is higher than the second shift delay criterion, the controller delays the upshift timing more than a default timing, and when the possibility of vehicle stuck is lower than the first shift delay criterion, the controller advances the upshift timing more than the default timing.

The controller is configured to receive vehicle speed data corresponding to a speed of the vehicle, and the shift timing control logic may be configured so that the controller delays or advances the upshift timing more as the speed of the vehicle increases.

The controller is configured to receive vehicle speed data corresponding to a speed of the vehicle and configures off-road type data of the vehicle, and the shift timing control logic may be configured to determine the shift delay criterion or the up-shift timing according to the speed of the vehicle and the off-road type data of the vehicle.

The off-road type data may include at least two of snow type data corresponding to a snowy road, sand type data corresponding to a sandy road, and mud type data corresponding to a muddy road, the controller may store a plurality of shift delay criterion sets, the plurality of shift delay criterion sets may include at least two of a snow type shift delay criterion set, a sand type shift delay criterion set, and a mud type shift delay criterion set, and the shift timing control logic may be configured to select one of the plurality of shift delay criterion sets according to the off-road type data and determine the upshift timing based on the speed of the vehicle and the possibility of vehicle stuck in the selected shift delay criterion set.

The controller is configured to receive vehicle speed data corresponding to the speed of the vehicle, and the shift timing control logic may be configured so that the controller further delays the upshift timing or lowers the shift delay criterion as the speed of the vehicle increases.

The shift timing control logic may be configured to determine the shift timing according to the speed of the vehicle, the off-road type of the vehicle, and the possibility of vehicle stuck.

The controller is configured to receive the off-road driving data from a sensor unit, and the off-road driving data may include at least one of a speed of the vehicle, acceleration of the vehicle, a yaw rate of the vehicle, a yaw acceleration of the vehicle, a steering angle of the vehicle, a number of rotations of a wheel of the vehicle, a torque of the vehicle, and an acceleration input value of the vehicle.

The shift timing control logic may be configured to periodically determine the shift timing at every predetermined determination period, and the determination period is less than 10 seconds.

The shift timing control logic may be configured to selectively control the shift timing depending on whether an off-road driving mode is used, and the controller may be configured to determine whether to use the off-road driving mode, either manually according to an input or automatically based on the off-road driving data.

According to another aspect of the present disclosure, a method for supporting off-road driving includes: storing a shift timing control logic of a vehicle based on a possibility of vehicle stuck in off-road terrain; receiving off-road driving data of the vehicle; and controlling a shift timing of the vehicle by applying the off-road driving data to the shift timing control logic.

The shift timing control logic may be configured to further delay the upshift timing when the possibility of vehicle stuck is higher than the shift delay criterion, compared to when the possibility of vehicle stuck is lower than the shift delay criterion.

The receiving may include receiving vehicle speed data corresponding to the speed of the vehicle, and the shift timing control logic may be configured to further delay the upshift timing or further lower the shift delay criterion as the speed of the vehicle increases.

The shift timing control logic may be configured to determine the upshift timing based on the speed of the vehicle, an off-road type of the vehicle, and the possibility of vehicle stuck.

According to another aspect of the present disclosure, there is provided a storage medium having recorded thereon one or more programs including instructions for executing a method for supporting off-road driving.

According to another aspect of the present disclosure, a vehicle includes: a controller including a processor and a storage medium having recorded thereon one or more programs configured to be executable by the processor, wherein the one or more programs include instructions for executing a method for supporting off-road driving.

According to another aspect of the present disclosure, a vehicle includes: a transmission; a sensor unit detecting off-road driving data; and a controller configured to control a shift timing of the transmission according to shift timing control data by applying the off-road driving data to a shift timing control logic, wherein the shift timing control logic may be configured to vary the shift timing according to a possibility of vehicle stuck in off-road terrain based on the off-road driving data.

The shift timing control logic may be configured to determine the shift timing based on a speed of the vehicle, an off-road type of the vehicle, and the possibility of vehicle stuck.

The off-road type data corresponding to the off-road type may include at least two of snow type data corresponding to a snowy road, sand type data corresponding to a sandy road, and mud type data corresponding to a muddy road, the controller may store a plurality of shift delay criterion sets, the plurality of shift delay criterion sets may include at least two of a snow type shift delay criterion set, a sand type shift delay criterion set, and a mud type shift delay criterion set, and the shift timing control logic may be configured to select one of the plurality of shift delay criterion sets according to the off-road type data and determine the upshift timing based on the speed of the vehicle and the possibility of vehicle stuck in the selected shift delay criterion set.

BRIEF DESCRIPTION OF DRAWINGS

The above and other aspects, features, and advantages of the present disclosure will be more clearly understood from the following detailed description, taken in conjunction with the accompanying drawings, in which:

FIG. 9 is a diagram illustrating a plurality of shift delay criterion sets of an apparatus and method for supporting off-road driving and a vehicle and a storage medium according to an exemplary embodiment of the present disclosure.

DETAILED DESCRIPTION

Figure 1:
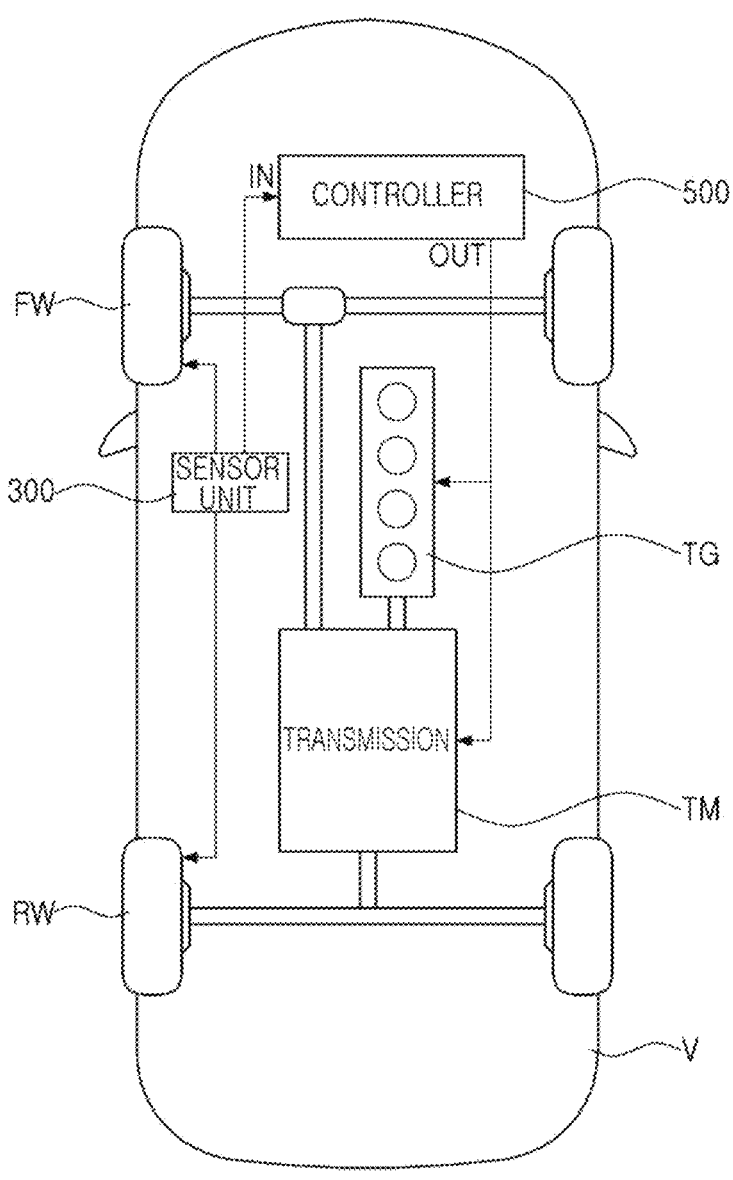
FIG. 1 and FIG. 2 are diagrams illustrating an apparatus for supporting off-road driving and a vehicle according to an exemplary embodiment of the present disclosure.

While the present disclosure may be modified in various ways and take on various alternative forms, specific embodiments thereof are shown in the drawings and described in detail below. However, it should be understood that there is no intent to limit the present disclosure to the particular forms disclosed, but on the contrary, the present disclosure covers all modifications, equivalents, and alternatives falling within the spirit and scope of the present disclosure.

It will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present disclosure. As used herein, the term "and/or" includes any and all combinations of one or more of the associated listed items.

The terms used herein to describe embodiments of the present disclosure is not intended to limit the scope of the present disclosure. The articles "a," and "an" are singular in that they have a single referent, however the use of the singular form in the present specification should not preclude the presence of more than one referent. In other words, elements of the present disclosure referred to in the singular may number one or more, unless the context clearly indicates otherwise. It will be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

Unless defined in a different way, all the terms used herein including technical and scientific terms have the same meanings as understood by those skilled in the art to which the present disclosure pertains. Such terms as defined in generally used dictionaries should be construed to have the same meanings as those of the contexts of the related art, and unless clearly defined in the application, they should not be construed to have ideally or excessively formal meanings.

In the present specification, vehicles refer to a variety of vehicles that move transported objects, such as people, animals, or goods, from a starting point to a destination. These vehicles are not limited to vehicles that run on roads or tracks.

Hereinafter, embodiments of the present disclosure will be described with reference to the accompanying drawings.

Figure 2:
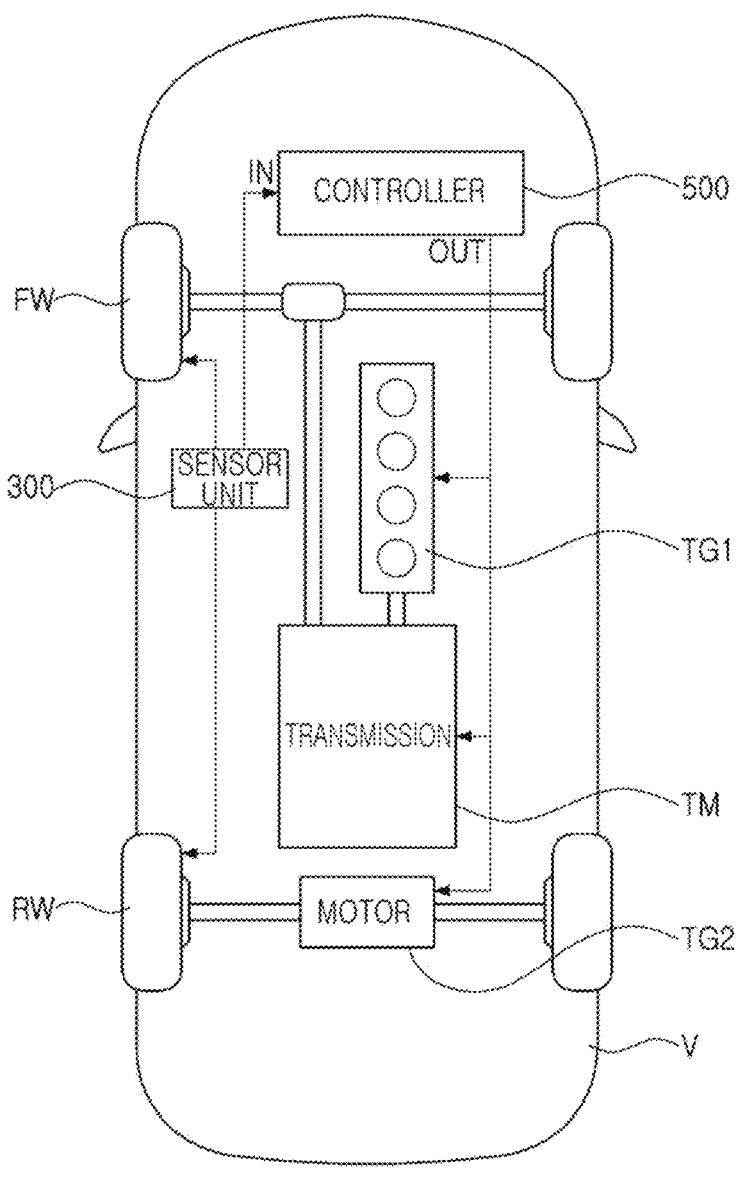

Referring to FIG. 1, a vehicle V may include an internal combustion engine vehicle having an engine TG. Referring to FIG. 2, the vehicle V may include a hybrid electric vehicle (including a plug-in hybrid electric vehicle) including an engine TG1 and a motor TG2. The configuration (e.g., number, position, connection relationship, etc.) of the motor TG2 is not limited.

Figure 3:
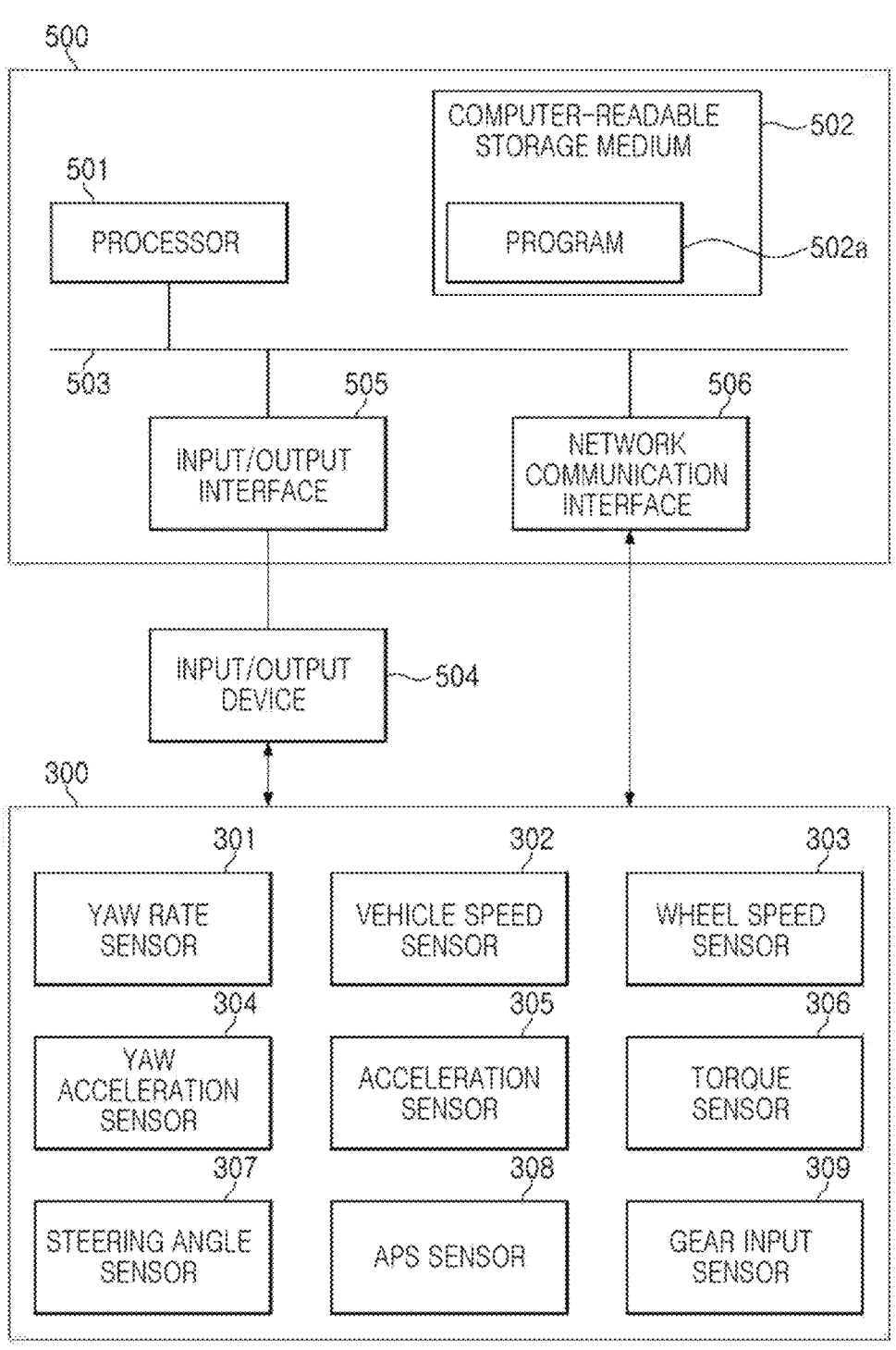
FIG. 3 is a block diagram specifically illustrating a controller and a sensor unit of an apparatus and method for supporting off-road driving and a vehicle and a storage medium according to an exemplary embodiment of the present disclosure.

Referring to FIGS. 1, 2, and 3, the vehicle V according to an exemplary embodiment of the present disclosure may include a transmission TM, a sensor unit 300, and a controller 500. For example, the controller 500 may include a vehicle control unit (VCU) and/or a microcontroller unit (MCU). The transmission TM may be an automatic transmission, but is not limited thereto.

The transmission TM may include a plurality of gears corresponding to different gear shifting levels (e.g., first gear, second gear), may automatically change the gear shifting level (e.g., first gear, second gear) of the vehicle V according to a predetermined shift pattern, and may use a selected gear among the plurality of gears. For example, the predetermined shift pattern may include a plurality of gear shifting criteria based on at least one of the speed, torque, and acceleration input values (e.g., throttle opening rate) of the vehicle V, and the transmission TM may perform gear shifting (e.g., shifting from first gear to second gear, shifting from second gear to first gear) corresponding to one of the plurality of gear shifting criteria when at least one of the real-time speed, real-time torque, and real-time acceleration input values of the vehicle V satisfies one of the plurality of gear shifting criteria.

The sensor unit 300 may monitor (continuously sense) at least one of the real-time speed, real-time torque, and real-time acceleration input values. A transmission control unit (TCU) may store the predetermined shift pattern in advance, receive at least one of the real-time speed, real-time torque, and real-time acceleration input values from the sensor unit 300, and control automatic change of the gear shifting level (e.g., first gear, second gear) based on the values received from a gear input sensor 309 of the sensor unit 300 and the predetermined shift pattern. The TCU may be disposed in the controller 500 and/or the transmission TM.

Figure 4:
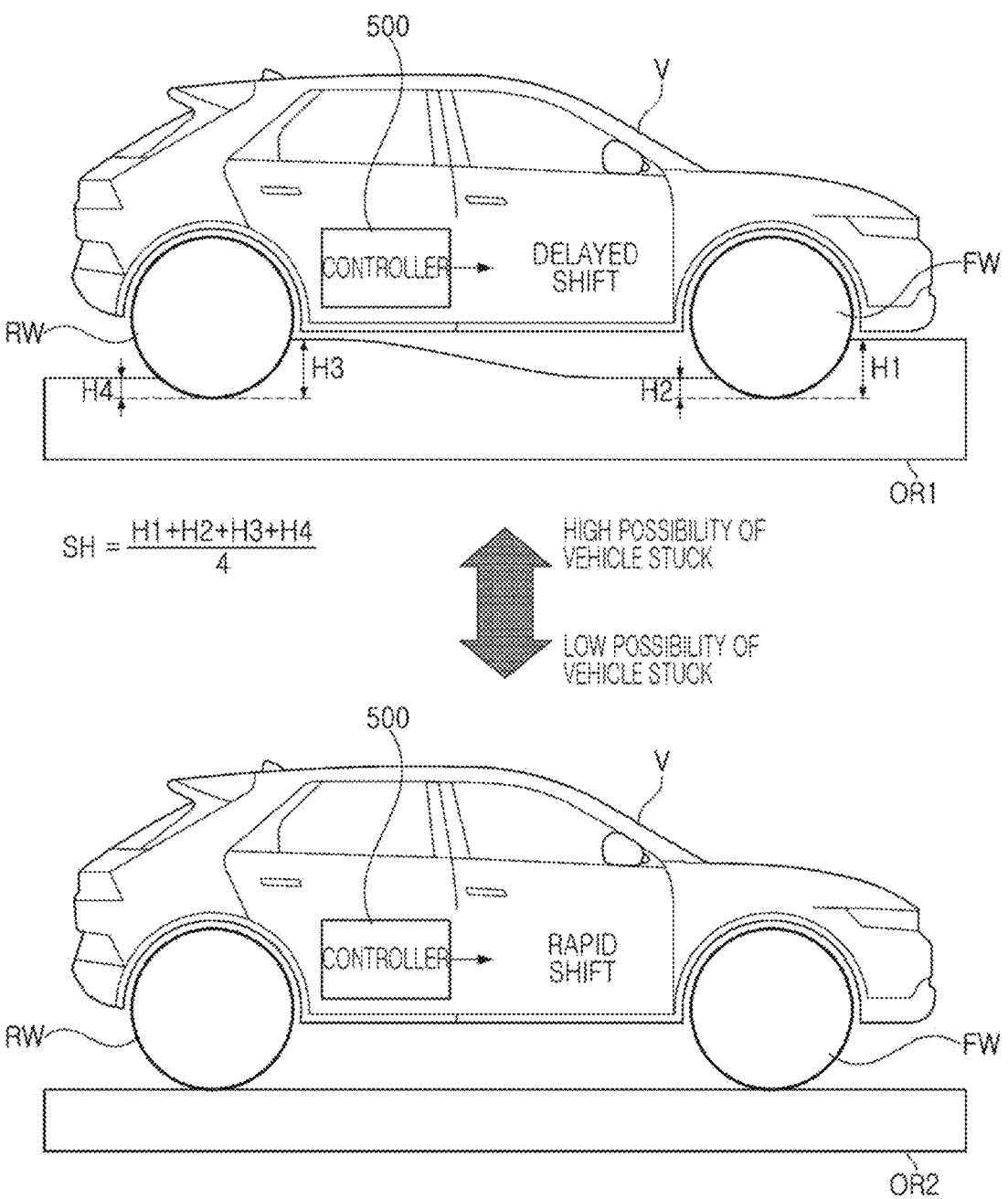
FIG. 4 is a diagram illustrating shift timing control according to the possibility of vehicle stuck of an apparatus and method for supporting off-road driving and a vehicle and a storage medium according to an exemplary embodiment of the present disclosure.

Referring to FIG. 4, the vehicle V may drive on off-roads OR1 and OR2. The off-roads OR1 and OR2 may include a non-road surface (e.g., a snowy road, a muddy road, a sandy road) and may include a road with a bad road condition.

Unlike an ideal road, road surface severity of the off-roads OR1 and OR2 may vary. For example, a major factor of road surface severity may include a road surface level deviation SH, and the road surface level deviation SH may be an average of a front level H1 of a front wheel FW, a rear level H2 of the front wheel FW, a front level H3 of a rear wheel RW, and a rear level H4 of the rear wheel RW, and the reference for the levels H1, H2, H3, and H4 may be, but is not limited to, the lowest level of the road surface.

However, the road surface severity may include additional factors (e.g., a change in road surface level deviation according to wheel torque, etc.) in addition to the road surface level deviation SH. For example, snow, mud, and sand may have different particle bonding strengths, so that the change in road surface level deviation according to wheel torque may be different in snow terrain, mud terrain, and sand terrain.

As the road surface severity (e.g., a road surface level deviation and/or a road surface level deviation change according to the torque of the wheel) of the off-roads OR1 and OR2 is higher, the possibility that a front wheel FW and/or a rear wheel RW of the vehicle V will get stuck at a specific point (e.g., a point at which a level slope is the steepest) of the off-roads OR1 and OR2 and cannot get out (i.e., the possibility of vehicle stuck) from the specific point may increase.

For example, the level deviation SH of the off-road OR1 may be greater than that of the off-road OR2, the road surface severity of the off-road OR1 may be greater than that of the off-road OR2, and the possibility of the vehicle V getting stuck on the off-road OR1 may be higher than that of the vehicle V getting stuck on the off-road OR2.

The sensor unit 300 may detect off-road driving data. For example, the off-road driving data may include at least one of a speed of the vehicle V (a sensing value of a vehicle speed sensor 302 of the sensor unit 300), an acceleration of the vehicle V (a sensing value of an acceleration sensor 305 of the sensor unit 300), a yaw rate of the vehicle V (a sensing value of a yaw rate sensor 301 of the sensor unit 300), a yaw acceleration of the vehicle V (a sensing value of the yaw acceleration sensor 304 of the sensor unit 300), a steering angle of the vehicle V (a sensing value of a steering angle sensor 307 of the sensor unit 300), revolutions per minute (rpm) of the wheels (the front wheel FW and/or the rear wheel RW) of the vehicle V (a sensing value of a wheel speed sensor 303 of the sensor unit 300), a torque of the vehicle V (a sensing value of a torque sensor 306 of the sensor unit 300), and an acceleration input value of the vehicle V (a sensing value of an APS sensor 308 of the sensor unit 300). The sensor unit 300 may include at least one of the vehicle speed sensor 302, the acceleration sensor 305, the yaw rate sensor 301, the yaw acceleration sensor 304, the steering angle sensor 307, the wheel speed sensor 303, the torque sensor 306, and the APS sensor 308.

The torque of the vehicle V may include a torque of the engine (or motor) and/or a torque of the wheels (the front wheel FW and/or the rear wheel RW). The acceleration of the vehicle V may include a longitudinal acceleration of the vehicle V and/or a lateral acceleration of the vehicle V. The yaw rate is a speed at which the posture of the vehicle V rotates in the yaw direction, and the yaw direction is a direction in which the vehicle V faces the ground (e.g., the direction of gravity). The APS of the APS sensor 308 may be an accelerator pedal sensor.

The controller 500 of the apparatus for supporting off-road driving and the vehicle V according to an exemplary embodiment of the present disclosure may receive the off-road driving data (IN of FIGS. 1 and 2) from the sensor unit (300 of FIGS. 1 and 2) and may be configured to control a shift timing of the transmission (TM of FIGS. 1 and 2) according to shift timing control data (OUT of FIGS. 1 and 2) by applying the off-road driving data to the shift timing control logic. The shift timing control logic may be configured to vary the shift timing (e.g., delayed shift or rapid shift) of the transmission (TM of FIGS. 1 and 2) according to the possibility (e.g., high, low) of the vehicle V being stuck on the off-roads OR1 and OR2 based on the off-road driving data.

Figure 5:
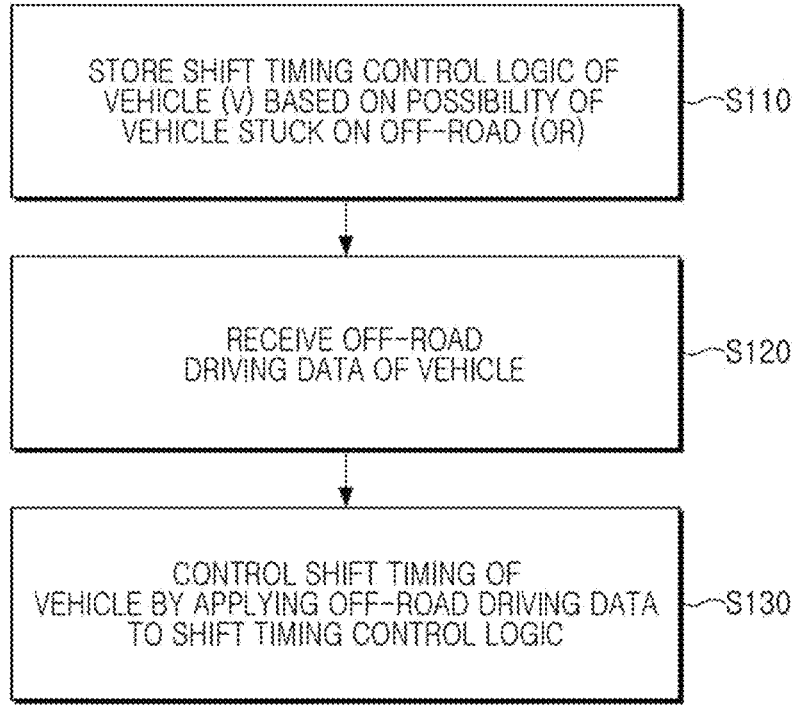
FIG. 5 is a flowchart illustrating a method for supporting off-road driving according to an exemplary embodiment of the present disclosure.

Referring to FIGS. 4 and 5, a method for supporting off-road driving according to an exemplary embodiment of the present disclosure may include an operation (S110) in which the controller 500 stores the shift timing control logic of the vehicle V based on a possibility of the vehicle V being stuck on the off-road OR; an operation (S120) in which the controller 500 receives off-road driving data of the vehicle V; and an operation (S130) in which the controller 500 applies the off-road driving data to the shift timing control logic to control the shift timing of the transmission (TM of FIGS. 1 and 2) of the vehicle V.

For example, since the possibility of the vehicle V being stuck on the off-road OR1 may be high, the controller 500 may delay an upshift timing in a situation in which the vehicle V has a potential to be stuck, extending the driving time of a low-speed gear with high driving force and stably utilizing the secured driving force, reducing the final possibility of the vehicle V getting stuck. According to the design, the controller 500 may advance a downshift timing of the vehicle V on the off-road OR1, further extending the driving time of the low gear with high driving force and stably utilizing the secured driving force, reducing the final possibility of the vehicle V getting stuck.

For example, since the possibility of the vehicle V getting stuck in off-road terrain OR2 may be low, the controller 500 may optimize at least one of the driving force, noise-vibration-harshness (NVH), and driving feel of the vehicle V by maintaining the upshift timing (e.g., when a default timing of the off-road driving mode is early) or advancing it (e.g., when the default timing of the off-road driving mode is late). Depending on the design, the controller 500 may also optimize at least one of the driving force, noise, vibration, and harshness (NVH), and driving feel of the vehicle V by maintaining the downshift timing of the vehicle V on the off-road OR2 (e.g., when the default timing of the off-road driving mode is late) or delaying it (e.g., when the default timing of the off-road driving mode is early).

Accordingly, the apparatus for supporting off-road driving and the vehicle V according to an exemplary embodiment of the present disclosure may efficiently increase the overall optimality of at least one of the driving force, NVH, and driving feel of the vehicle V, while efficiently reducing the overall final possibility of vehicle stuck on the off-road terrains OR1 and OR2 even if the road surface severity of the off-road terrains OR1 and OR2 varies.

For example, to change the shift timing (e.g., delayed shift, rapid shift), the controller 500 may change a plurality of gear shifting criteria (criteria for comparison with at least one of the vehicle speed, torque, and acceleration input values) of a predetermined shift pattern of the transmission TM or change a time length from the time when at least one of the vehicle speed, torque, and acceleration input values reaches one of the plurality of gear shifting criteria to an actual shift time. That is, the concept of changing the gear shifting timing (e.g., delayed shift, rapid shift) may include changing a gear shifting criterion of the transmission TM and may include changing an actual shift time of the transmission TM.

For example, if the vehicle V is in a situation in which it is about to shift up, the speed and/or acceleration input value of the vehicle V may gradually increase over time. Here, as the gear shifting criterion of the transmission TM increases, the time at which the speed and/or acceleration input value reaches the gear shifting criterion may be delayed. Accordingly, the controller 500 may increase the gear shifting criterion of the transmission TM to delay the shift timing. Alternatively, the controller 500 may extend the time length from the time at which the speed and/or acceleration input value reaches the gear shifting criterion to the actual shift time to delay the shift timing.

Figure 6:
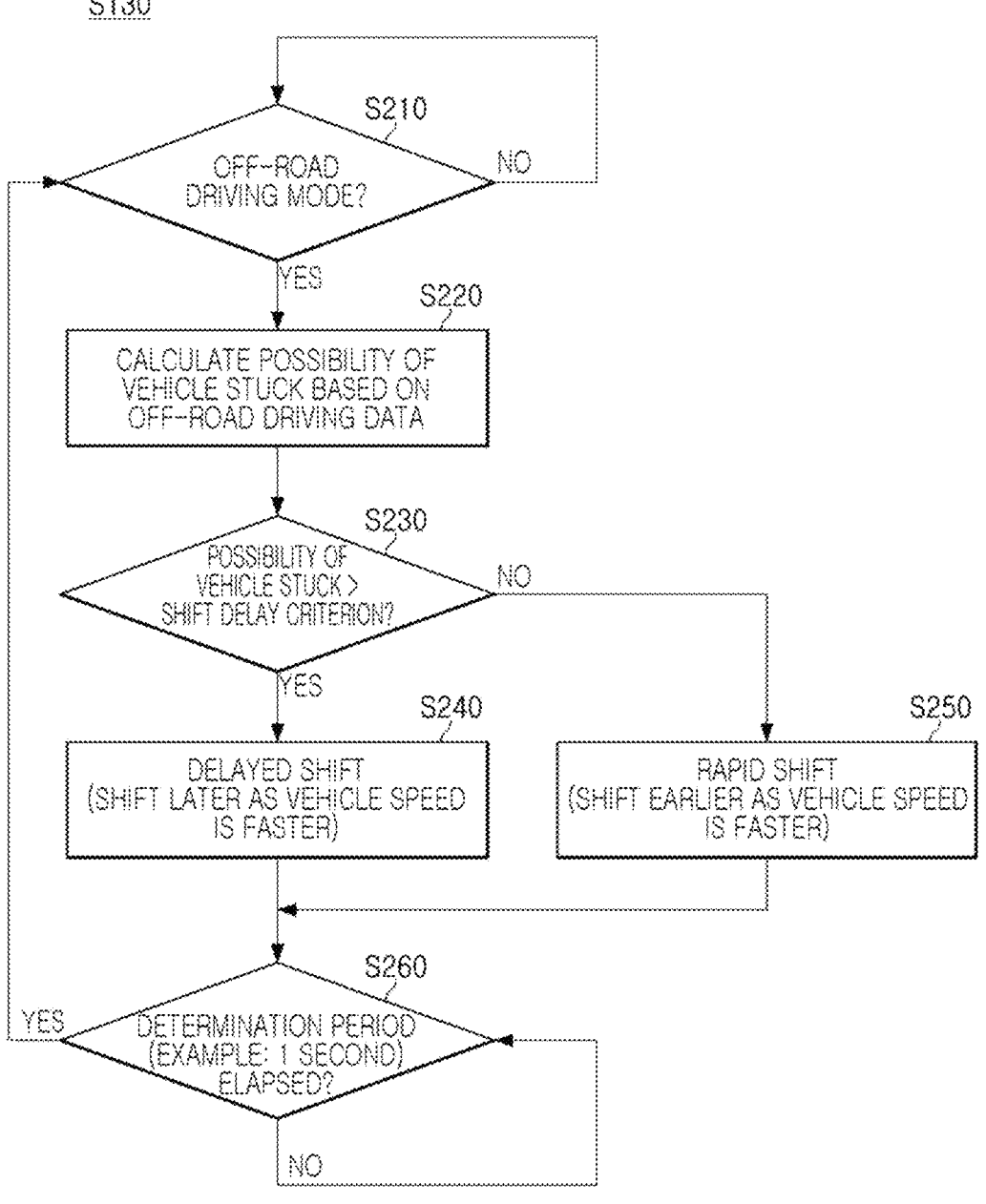
FIG. 6 is a flowchart illustrating an operation of an apparatus and method for supporting off-road driving and a vehicle and a storage medium based on a shift delay criterion according to an exemplary embodiment of the present disclosure.

Referring to FIGS. 4 and 6, the shift timing control logic may be configured to determine (S220) the possibility of vehicle stuck (e.g., stuck score data) based on off-road driving data. For example, the shift timing control logic may include logic (e.g., equations for the determination) for determining the possibility of vehicle stuck (e.g., stuck score data).

For example, to increase the accuracy of determining (or estimating) the possibility of vehicle stuck from off-road driving data, vehicle (prototype) driving experiments on various off-road terrains may be conducted cumulatively. In the present process, the controller 500 may gradually optimize (e.g., optimization of coefficients and constants of equations for the determination) the logic (which may be included in the shift timing control logic) for determining the possibility of vehicle stuck (e.g., stuck score data) from off-road driving data.

For example, the controller 500 may further increase the accuracy of the possibility of vehicle stuck by determining parameter data between the off-road driving data and the possibility of vehicle stuck. For example, the parameter data may include a slip ratio of the wheel (the front wheel FW and/or the rear wheel RW) and/or a coefficient of friction for off-road. The slip ratio may be defined as a value obtained by dividing a difference between the number of rotations of the wheels (front wheels FW and/or rear wheels RW) and the speed of the vehicle V by the number of rotations or the speed. The coefficient of friction may be defined by a different equation than the slip ratio.

For example, in a situation in which the vehicle V has a possibility to become stuck, a load of the wheels (front wheels FW and/or rear wheels RW) may be reduced, and as the load is reduced, the slip ratio may be increased. The slip ratio may also be increased when the coefficient of friction is reduced. As the value obtained by dividing the slip ratio by the coefficient of friction increases, the road surface severity may be increased and the possibility of vehicle stuck may be increased. Therefore, the controller 500 may accurately estimate the possibility of vehicle stuck (e.g., stuck score data) based on at least one of the slip ratio, the coefficient of friction, and the road surface severity.

The shift timing control logic may be configured to selectively (YES/NO in S210) control shift timing depending on whether the off-road driving mode is used. The controller 500 may be configured to determine whether the off-road driving mode is used, either manually according to input (e.g., a mode setting method through manual input by a driver) or automatically based on the off-road driving data (e.g., a method of setting a mode by automatically determining whether the minimum criterion for road surface severity or possibility of vehicle stuck is reached).

Accordingly, the possibility that other control logic used when the vehicle V is not driving on an off-road conflicts with the shift timing control logic may be prevented in advance. For example, the controller 500 may deactivate the off-road driving mode when the vehicle V is driving on a paved road and may activate the off-road driving mode when the vehicle V is driving on an off-road.

The shift timing control logic may be configured so that when the possibility of vehicle stuck is lower than the shift delay criterion (NO in S230), the controller 500 is configured to control the upshift (or default timing upshift) relatively rapidly (S250), and when the possibility of vehicle stuck is higher than the shift delay criterion (YES in S230), the controller 500 is configured to control the upshift relatively delayed (S240). That is, the shift timing control logic may be configured so that the controller 500 delays the upshift timing more when the possibility of vehicle stuck is higher than the shift delay criterion compared to when the possibility of vehicle stuck is lower than the shift delay criterion. Furthermore, the shift timing control logic may be configured so that the controller delays the upshift timing more as the speed of the vehicle increases in control (S240) and may be configured so that the controller advances the upshift timing more as the speed of the vehicle increases in control (S250).

The shift timing control logic may be configured to determine the shift timing periodically (S260) at every predetermined determination period. Accordingly, the shift timing control accuracy/reliability may be further improved. For example, the determination period may be less than 10 seconds (e.g., 1 second), but is not limited thereto. A lower limit (e.g., 0.1 seconds, 0.01 seconds) of the determination period may vary depending on the performance of the controller 500.

Figure 7:
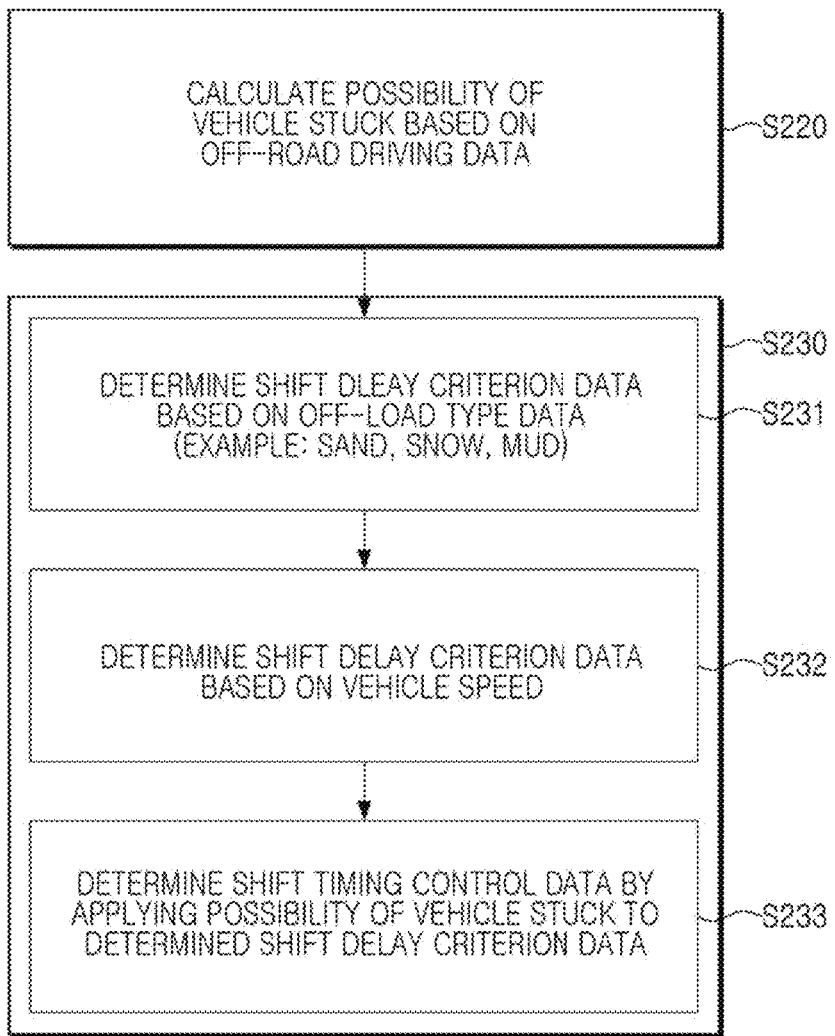
FIG. 7 is a flowchart illustrating an operation in which a shift delay criterion and/or shift timing of an apparatus and method for supporting off-road driving and a vehicle and a storage medium according to an exemplary embodiment of the present disclosure are determined according to off-road type data and/or vehicle speed.

Referring to FIGS. 6 and 7, the shift timing control logic may be configured to determine (S231) the shift delay criterion (and/or shift timing) based on the off-road type data (e.g., SAND, SNOW, MUD) of the vehicle V and may be configured to determine (S232) the shift delay criterion (and/or shift timing) data based on the vehicle speed data (e.g., the sensing value of the vehicle speed sensor 302 of the sensor unit (300 of FIG. 3)) corresponding to the speed of the vehicle V. The shift timing control logic may be configured to determine the shift timing of the transmission (TM of FIGS. 1 and 2) based on the off-road type and/or vehicle speed of the vehicle V and the possibility of vehicle stuck. For example, the controller 500 may configure off-road type data of the vehicle V (e.g., generate according to a separate control logic, such as terrain mode, or generate through manual input by a driver) prior to receiving the off-road driving data and may further receive vehicle speed data from the vehicle speed sensor 302 of the sensor unit (300 of FIG. 3) while receiving the off-road driving data.

Accordingly, the accuracy/reliability of the shift timing control may be further improved. For example, as the speed of the vehicle V is faster, the gear shifting level of the vehicle may be higher. As the gear shifting level (inversely proportional to driving force) of the vehicle is higher, it may take longer time for the vehicle to secure sufficient driving force. Therefore, since the shift timing control logic is configured to change the shift timing more significantly as the speed of the vehicle V is faster, the controller may more stably secure the time it takes for the vehicle to secure sufficient driving force.

Figure 8:
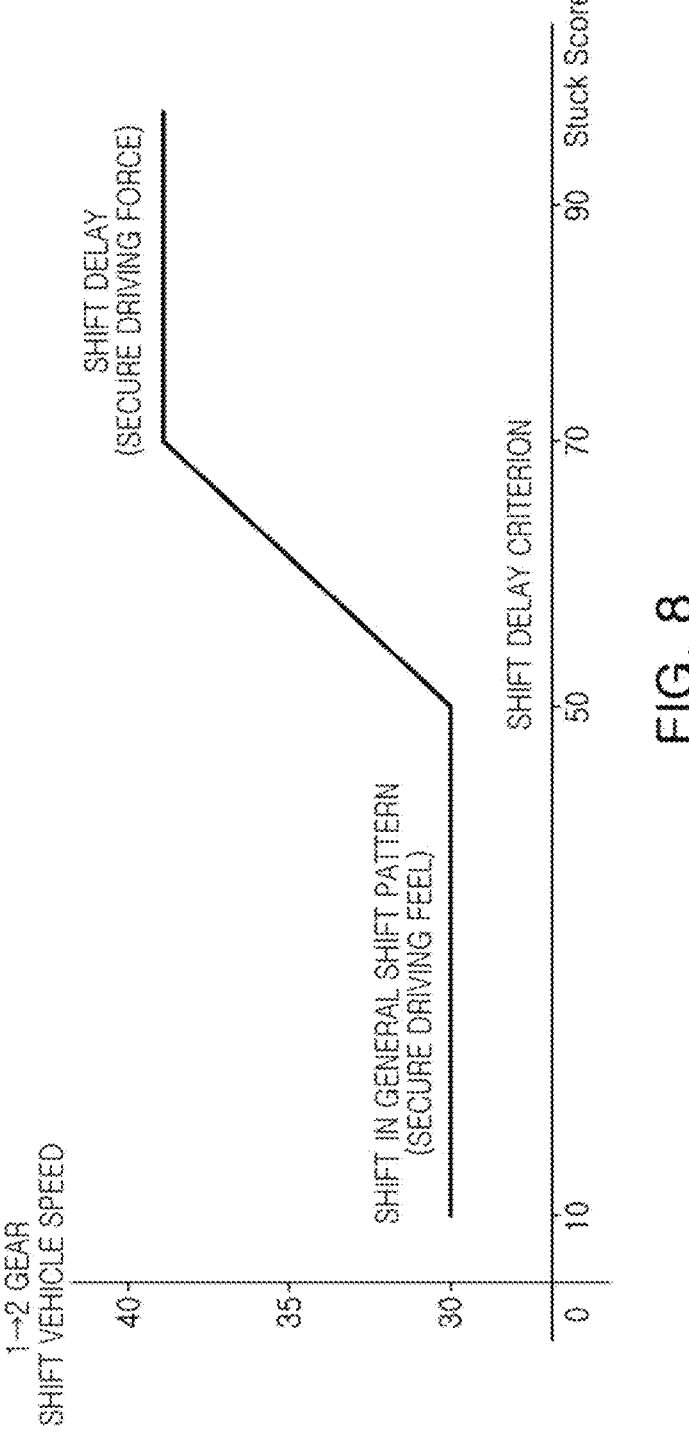
FIG. 8 is a graph illustrating a shift delay criterion and/or shift timing according to a possibility of vehicle stuck of an apparatus and method for supporting off-road driving and a vehicle and a storage medium according to an exemplary embodiment of the present disclosure.

Referring to FIG. 8, the shift delay criterion may have a vehicle stuck possibility range (e.g., 50 to 70), and the shift timing control logic may be configured to delay the shift timing more as the possibility of vehicle stuck falls within the vehicle stuck possibility range. For example, further delaying the shift timing may be implemented by increasing the vehicle speed criterion (e.g., 30 km/h to 40 km/h) of the gear shifting criterion for upshifting from first gear to second gear, but is not limited thereto.

Similarly, the shift delay criterion data of FIG. 7 may be configured as data for determining whether to delay the shift and the shift timing, and the shift delay criterion of FIG. 6 may also have a vehicle stuck possibility range.

Referring to FIGS. 7 and 9, the off-road type data may include at least two of snow type data SNOW corresponding to a snowy road, sand type data SAND corresponding to a sandy road, and mud type data (which may be the same as the sand type data) corresponding to a muddy road. The shift delay criterion of the snow type data SNOW (e.g., 10 or 30), the shift delay criterion of the mud type data, and the shift delay criterion of the sand type data SAND (e.g., 40 or 50) may be different from each other, but is not limited thereto.

For example, the off-road driving mode (or separate control logic, such as terrain mode) of the controller may advance the default timing corresponding to the snow type data SNOW to prevent vehicle slippage due to wheel slip on a snowy road. The default timing may be a set timing that does not substantially consider the possibility of vehicle stuck. To correspond thereto, the shift timing control logic may lower the shift delay criterion of the snow type data SNOW (e.g., 10 or 30) to be lower than the shift delay criterion (e.g., 40 or 50) of the sand type data SAND (and/or mud type data), so that the controller may further enhance the overall driving force on the snowy road and more effectively reduce the final possibility of vehicle stuck on the snowy road. Therefore, the accuracy/reliability of the shift timing control may be further improved.

Referring to FIG. 9, the controller may store a plurality of shift delay criterion sets (e.g., two-dimensional data including vehicle speed and a possibility of vehicle stuck (Stuck Score) or one-dimensional data including a possibility of vehicle stuck (Stuck Score), and the plurality of shift delay criterion sets may include at least two of a snow type shift delay criterion set (corresponding to SNOW), a sand type shift delay criterion set (corresponding to SAND), and a mud type shift delay criterion set (which may be the same as the sand type shift delay criterion set).

The shift timing control logic may be configured to determine the shift timing according to the speed of the vehicle, the off-road type of the vehicle, and the possibility of vehicle stuck. For example, 0 of the shift timing control data of FIG. 9 may correspond to a default timing (e.g., a default timing of an off-road driving mode or terrain mode), a positive number of the shift timing control data of FIG. 9 may correspond to a delayed shift, and a negative number of the shift timing control data of FIG. 9 may correspond to a rapid shift. The numerical value (e.g., 100) of the shift timing control data of FIG. 9 may correspond to revolutions per minute (RPM) change value (e.g., 100 RPM change) of the wheel (front wheel and/or rear wheel) of the gear shifting criterion. For example, if the plurality of shift delay criterion sets are N-dimensional data, the plurality of shift delay criterion sets may be configured as a shift delay criterion set of single (N+1)-dimensional data.

For example, the shift timing control logic may be configured to select one of the plurality of shift delay criterion sets according to the off-road type data (corresponding to S231 of FIG. 7) and determine the shift timing based on the vehicle speed (corresponding to S232 of FIG. 7) and the possibility of vehicle stuck (corresponding to S233 of FIG.

7) in the selected shift delay criterion set. Accordingly, the possibility of confusion occurring between input variables (e.g., off-road type, vehicle speed, possibility of vehicle stuck) which may be used for shift timing control may be prevented in advance.

The shift timing control logic may be configured so that the controller delays the upshift timing or lowers the shift delay criterion as the vehicle speed increases. For example, when the vehicle speed is slow, such as 10 km/h to 20 km/h, the shift delay criterion corresponding to sand type data SAND may be 50 to 70, and the shift delay criterion corresponding to snow type data SNOW may be 30 to 40. Meanwhile, when the vehicle speed is faster, such as 20 km/h or more, the shift delay criterion corresponding to sand type data SAND may be lowered to 40 to 50 and the shift delay criterion corresponding to snow type data SNOW may be lowered to 10 to 20.

Figure 10:
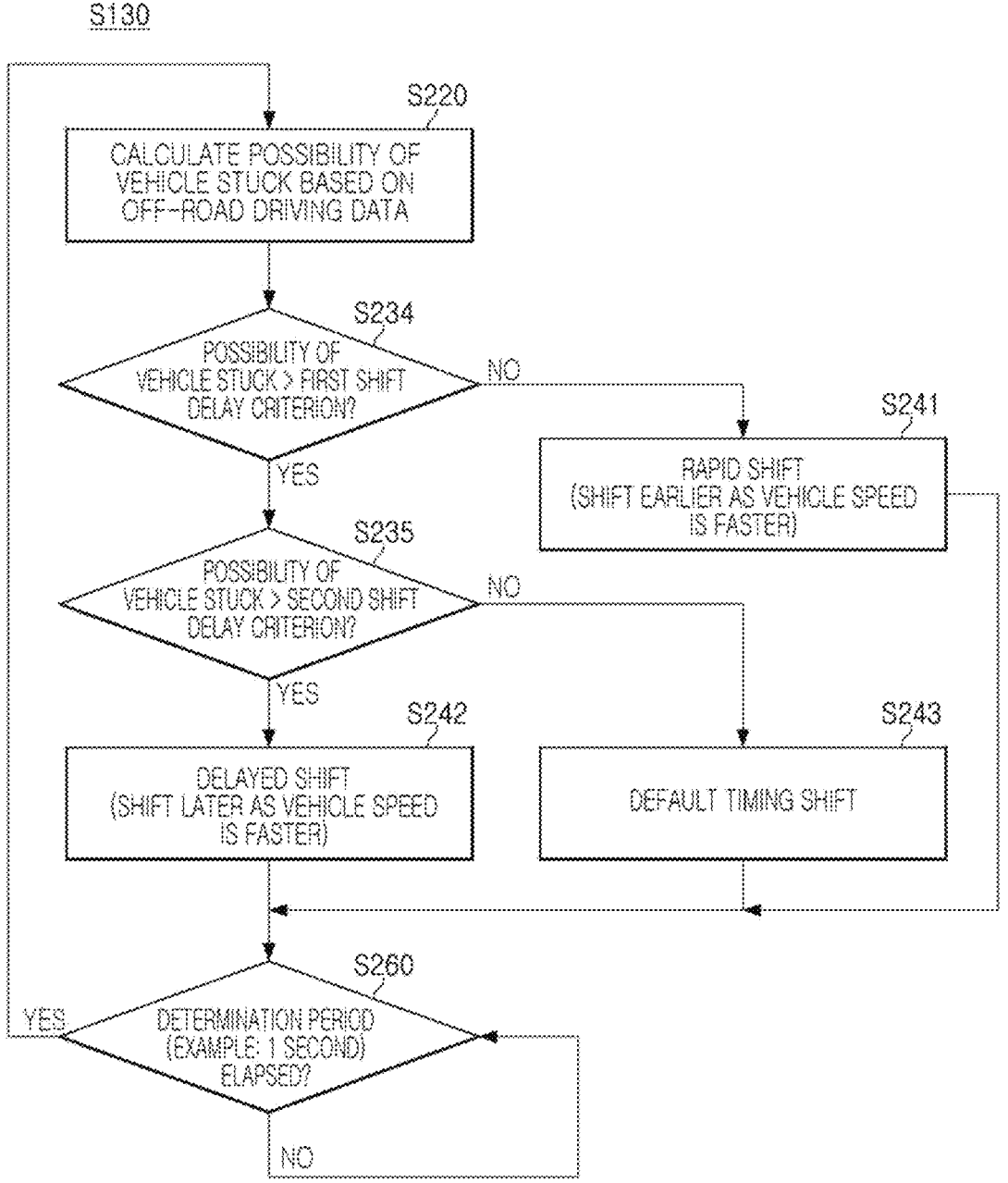
FIG. 10 is a flowchart illustrating an operation of an apparatus and method for supporting off-road driving and a vehicle and a storage medium according to an exemplary embodiment of the present disclosure based on first and second shift delay criteria.

Referring to FIGS. 9 and 10, the shift timing control logic may be configured so that if the possibility of vehicle stuck is higher than the second shift delay criterion (YES in S235), the controller is configured to control (S242) a delayed shift (a shift for delaying more than the default timing), and if the possibility of vehicle stuck is lower than the second shift delay criterion (NO in S235 or NO in S234), the controller controls (S241 or S243) not to perform a delayed shift, and if the possibility of vehicle stuck is lower than the first shift delay criterion (NO in S234), the controller is configured to control (S241) a rapid shift (a shift for advancing more than the default timing), and if the possibility of vehicle stuck is higher than the first shift delay criterion (YES in S234), the controller is configured to control (S243) a default timing shift.

Referring to FIG. 9, the shift delay criterion set corresponding to the sand type data SAND (and/or mud type data) includes a first shift delay criterion (e.g., 10 to 20 at low speed and 20 to 30 at high speed) and a second shift delay criterion (e.g., 50 to 70 at low speed and 40 to 50 at high speed), and the shift delay criterion set corresponding to the snow type data SNOW may not include the first shift delay criterion but may include the second shift delay criterion (e.g., 30 to 40 at low speed and 10 to 20 at high speed). The low speed signifies a speed lower than a predetermined reference speed and the high speed signifies a speed greater than a predetermined reference speed.

Meanwhile, referring to FIG. 3, the controller 500 may be implemented as a computing system including at least one processor 501, a computer-readable storage medium 502, and a communication bus 503. For example, the controller 500 may be implemented as a microcontroller, an embedded system, a system on chip, etc. The storage medium 502 may record one or more programs including commands for executing a method for supporting off-road driving according to an exemplary embodiment of the present disclosure. The communication bus 503 may interconnect various other components of the computing device 500, including the processor 501 and the computer-readable storage medium 502.

The processor 501 may cause the controller 500 to operate according to the exemplary embodiments described above. For example, the processor 501 may execute one or more programs stored on the computer-readable storage medium 502. The one or more programs may include one or more computer-executable instructions, which, when executed by the processor 501, may be configured to cause the controller 500 to perform operations according to the embodiments.

The computer-readable storage medium 502 may be configured to store computer-executable instructions or program code, program data, and/or other suitable forms of information. A program 502a stored on the computer-readable storage medium 502 includes a set of instructions executable by the processor 501. In an exemplary embodiment of the present disclosure, the computer-readable storage medium 502 may be memory (volatile memory, such as random access memory, nonvolatile memory, or a suitable combination thereof), one or more magnetic disk storage devices, optical disk storage devices, flash memory devices, or any other form of storage medium which may be accessed by the controller 500 and configured for storing target information, or a suitable combination thereof.

The controller 500 may also include one or more input/output interfaces 505 providing an interface for one or more input/output devices 504 and one or more network communication interfaces 506. The input/output interfaces 505 and the network communication interfaces 506 are connected to the communication bus 503. The network may be one of a cellular network, such as Global System for Mobile Communications (GSM), Enhanced Data Rates for GSM Evolution (EDGE), General Packet Radio Service (GPRS), Code Division Multiple Access (CDMA), Time Division-CDMA (TD-CDMA), Universal Mobile Telecommunications System (UMTS), Long Term Evolution (LTE), 5G, Wi-Fi, or another cellular network, and may also be implemented as Ethernet, Media Oriented Systems Transport (MOST), Flexray, Controller region Network (CAN), Local Interconnect Network (LIN), Internet, Bluetooth®, Near Field Communication (NFC), Zigbee®, Radio Frequency (RF), etc.

The input/output device 504 may be connected to other components of the controller 500 via the input/output interface 505. The input/output devices 504 may include, for example, input devices, such as pointing devices (such as a mouse or trackpad), keyboards, touch input devices (such as a touchpad or a touchscreen), voice or sound input devices, various types of sensor devices and/or image capturing devices, and/or output devices, such as display devices, printers, speakers, and/or network cards. For example, the input/output devices 504 may be included inside the controller 500 as a component constituting the controller 500 or may be connected to the controller 500 as a separate device distinct from the controller 500.

Meanwhile, the embodiments of the present disclosure may include a program for performing the methods described in the present specification on a computer and a computer-readable recording medium including the program. The computer-readable recording medium may include program instructions, local data files, local data structures, etc., alone or in combination. The medium may be those specifically designed and configured for the present disclosure or may be those commonly available in the computer software field. Examples of computer-readable recording medium include magnetic medium, such as hard disks, floppy disks, and magnetic tapes, optical recording medium, such as CD-ROMs, DVDs, and hardware devices specifically configured to store and perform program instructions, such as ROM, RAM, flash memory, etc. Examples of the program may include not only machine language code, such as that generated by a compiler, but also high-level language code which may be executed by a computer using an interpreter or the like.

The apparatus and method for supporting off-road driving and the vehicle and storage medium including the same according to an exemplary embodiment of the present disclosure may efficiently increase the overall optimality of at least one of driving force, noise-vibration-harshness (NVH), and/or driving feel of the vehicle, while effectively reducing the overall final possibility of vehicle stuck in off-road terrain even if road surface severity of the off-road terrain varies.

While embodiments have been shown and described above, it will be apparent to those skilled in the art that modifications and variations could be made without departing from the scope of the present disclosure as defined by the appended claims.

What is claimed is:

1. An apparatus for supporting off-road driving, the apparatus comprising:
a controller configured to receive off-road driving data of a vehicle and control a shift timing of the vehicle according to shift timing control data by applying the off-road driving data to a shift timing control logic,
wherein the shift timing control logic is configured to vary the shift timing according to a possibility of the vehicle stuck in off-road terrain based on the off-road driving data.

2. The apparatus of claim 1, wherein the shift timing control logic is further configured so that the controller delays an upshift timing more when the possibility of vehicle stuck is higher than a shift delay criterion compared to when the possibility of vehicle stuck is lower than the shift delay criterion.

3. The apparatus of claim 2,
wherein the shift delay criterion includes a first shift delay criterion and a second shift delay criterion higher than the first shift delay criterion, and
wherein the shift timing control logic is further configured so that when the possibility of vehicle stuck is higher than the second shift delay criterion, the controller delays the upshift timing more than a default timing, and when the possibility of vehicle stuck is lower than the first shift delay criterion, the controller advances the upshift timing more than the default timing.

4. The apparatus of claim 3,
wherein the controller receives vehicle speed data corresponding to a speed of the vehicle, and
wherein the shift timing control logic is further configured so that the controller delays or advances the upshift timing more as the speed of the vehicle increases.

5. The apparatus of claim 2,
wherein the controller receives vehicle speed data corresponding to a speed of the vehicle and configures off-road type data of the vehicle, and
wherein the shift timing control logic is further configured to determine the shift delay criterion or the upshift timing according to the speed of the vehicle and the off-road type data of the vehicle.

6. The apparatus of claim 5,
wherein the off-road type data includes at least two of snow type data corresponding to a snowy road, sand type data corresponding to a sandy road, or mud type data corresponding to a muddy road,
wherein the controller stores a plurality of shift delay criterion sets,
wherein the plurality of shift delay criterion sets include at least two of a snow type shift delay criterion set, a sand type shift delay criterion set, or a mud type shift delay criterion set, and
wherein the shift timing control logic is further configured to select one of the plurality of shift delay criterion sets according to the off-road type data and determine the upshift timing based on the speed of the vehicle and the possibility of vehicle stuck in the selected shift delay criterion set.

7. The apparatus of claim 2,
wherein the controller receives vehicle speed data corresponding to a speed of the vehicle, and
wherein the shift timing control logic is further configured so that the controller further delays the upshift timing or lowers the shift delay criterion as the speed of the vehicle increases.

8. The apparatus of claim 1, wherein the shift timing control logic is further configured to determine the shift timing according to a speed of the vehicle, an off-road type of the vehicle, and the possibility of vehicle stuck.

9. The apparatus of claim 1,
wherein the controller receives the off-road driving data from a sensor unit, and
wherein the off-road driving data includes at least one of a speed of the vehicle, acceleration of the vehicle, a yaw rate of the vehicle, a yaw acceleration of the vehicle, a steering angle of the vehicle, a number of rotations of a wheel of the vehicle, a torque of the vehicle, or an acceleration input value of the vehicle.

10. The apparatus of claim 9,
wherein the shift timing control logic is further configured to periodically determine the shift timing at every predetermined determination period, and
wherein the determination period is less than 10 seconds.

11. The apparatus of claim 9,
wherein the shift timing control logic is further configured to selectively control the shift timing depending on whether an off-road driving mode is used, and
wherein the controller determines whether to use the off-road driving mode, either manually according to an input or automatically based on the off-road driving data.

12. A method for supporting off-road driving, the method comprising:
storing a shift timing control logic of a vehicle based on a possibility of vehicle stuck in off-road terrain;
receiving off-road driving data of the vehicle; and
controlling, by a controller, a shift timing of the vehicle by applying the off-road driving data to the shift timing control logic.

13. The method of claim 12, wherein the shift timing control logic is configured to further delay an upshift timing when the possibility of vehicle stuck is higher than a shift delay criterion, compared to when the possibility of vehicle stuck is lower than the shift delay criterion.

14. The method of claim 13,
wherein the receiving includes receiving vehicle speed data corresponding to a speed of the vehicle, and
wherein the shift timing control logic is configured to further delay the upshift timing or further lower the shift delay criterion as the speed of the vehicle increases.

15. The method of claim 14, wherein the shift timing control logic is configured to determine the upshift timing based on the speed of the vehicle, an off-road type of the vehicle, and the possibility of vehicle stuck.

16. A storage medium having recorded thereon one or more programs including instructions for executing the method for supporting the off-road driving of claim 12.

17. A vehicle comprising:
the controller including a processor and a storage medium having recorded thereon one or more programs configured to be executable by the processor, wherein the one or more programs include instructions for executing the method for supporting off-road driving of claim 12.

18. A vehicle comprising:

a transmission;

a sensor unit detecting off-road driving data; and a controller configured to control a shift timing of the transmission according to shift timing control data by applying the off-road driving data to a shift timing control logic, wherein the shift timing control logic is configured to vary the shift timing according to a possibility of vehicle stuck in off-road terrain based on the off-road driving data.

19. The vehicle of claim 18, wherein the shift timing control logic is further configured to determine the shift timing based on a speed of the vehicle, an off-road type of the vehicle, and the possibility of vehicle stuck.

20. The vehicle of claim 19, wherein off-road type data corresponding to the off-road type includes at least two of snow type data corresponding to a snowy road, sand type data corresponding to a sandy road, or mud type data corresponding to a muddy road, wherein the controller stores a plurality of shift delay criterion sets, wherein the plurality of shift delay criterion sets include at least two of a snow type shift delay criterion set, a sand type shift delay criterion set, or a mud type shift delay criterion set, and wherein the shift timing control logic is further configured to select one of the plurality of shift delay criterion sets according to the off-road type data and determine an upshift timing based on the speed of the vehicle and the possibility of vehicle stuck in the selected shift delay criterion set.

\* \* \* \* \*